United States Patent
Wakuda

(10) Patent No.: US 6,534,699 B2
(45) Date of Patent: Mar. 18, 2003

(54) INSTRUCTION INPUT DEVICE FOR ELECTRONIC MUSICAL INSTRUMENT

(75) Inventor: Sadamoto Wakuda, Shizuoka (JP)

(73) Assignee: Kabushiki Kaisha Kawai Gakki Seisakusho, Hamamatsu (JP)

( * ) Notice: Subject to any disclaimer, the term of this patent is extended or adjusted under 35 U.S.C. 154(b) by 0 days.

(21) Appl. No.: 10/041,341

(22) Filed: Jan. 8, 2002

(65) Prior Publication Data

US 2002/0092410 A1 Jul. 18, 2002

(30) Foreign Application Priority Data

Jan. 18, 2001 (JP) ........................................ 2001-009924

(51) Int. Cl.[7] .............................................. G09B 15/08
(52) U.S. Cl. .................... 84/477 R; 84/653; 178/18.01; 345/173
(58) Field of Search ....................... 345/173; 178/18.01; 84/600, 477 R, 615, 653

(56) References Cited

U.S. PATENT DOCUMENTS 5,327,161 A * 7/1994 Logan et al. ................ 345/157
5,404,458 A * 4/1995 Zetts ........................... 345/173
5,943,043 A * 8/1999 Furuhata et al. ............. 345/173
5,995,083 A * 11/1999 Sato et al. .................. 178/18.01

FOREIGN PATENT DOCUMENTS

JP         07-334295        12/1995

* cited by examiner

Primary Examiner—Jeffrey Donels
(74) Attorney, Agent, or Firm—Christie, Parker & Hale, LLP

(57) ABSTRACT

A variety of instructions are inputted through different input modes on a single touch panel. Calculator 22 calculates the coordinates of the contact point on the touch panel 91. Area table 24 has a flag assigned to each area in each image for indicating that the segment is a continuous press input area. Area identifier 25 examines the area table 24 whether the contact point on the panel is in the continuous or the instant touch input area. Examined area attribute is saved in an input mode storage 26. When receiving the mode data from the storage 26 and the coordinates, a screen controller 20 switches the image to another or updates the settings and graphic item in the image. In response to the mode data of the storage 26 and the coordinate data, a parameter setting 27 modifies the parameters of the envelope or effect.

20 Claims, 7 Drawing Sheets

Fig. 8

SCREEN IMAGE No. 1, TOUCH AREA ADRESS{
    {X1_1_1, Y1_1_1, X1_1_2, Y1_1_2},
    {X1_2_1, Y1_2_1, X1_2_2, Y1_2_2},
    {X1_3_1, Y1_3_1, X1_3_2, Y1_3_2},

{X1_n1_1, Y1_n1_1, X1_n1_2, Y1_n1_2},
    },
SCREEN IMAGE No. 2, TOUCH AREA ADRESS{
    {X2_1_1, Y2_1_1, X2_1_2, Y2_1_2},
    {X2_2_1, Y2_2_1, X2_2_2, Y2_2_2},
    {X2_3_1, Y2_3_1, X2_3_2, Y2_3_2},

{X2_n2_1, Y2_n2_1, X2_n2_2, Y2_n2_2},
    },
SCREEN IMAGE No. 3, TOUCH AREA ADRESS{
    {X3_1_1, Y3_1_1, X3_1_2, Y3_1_2},
    {X3_2_1, Y3_2_1, X3_2_2, Y3_2_2},
    {X3_3_1, Y3_3_1, X3_3_2, Y3_3_2},

{X3_n3_1, Y3_n3_1, X3_n3_2, Y3_n3_2},
    },

SCREEN IMAGE No. m, TOUCH AREA ADRESS{
    {Xm_1_1, Ym_1_1, Xm_1_2, Ym_1_2},
    {Xm_2_1, Ym_2_1, Xm_2_2, Ym_2_2},
    {Xm_3_1, Ym_3_1, Xm_3_2, Ym_3_2},

{Xm_nm_1, Ym_nm_1, Xm_nm_2, Ym_nm_2},
    },

INSTRUCTION INPUT DEVICE FOR ELECTRONIC MUSICAL INSTRUMENT

CROSS-REFERENCE TO RELATED APPLICATION

This application claims priority of Japanese patent Application No. 2001-9924, filed on Jan. 18, 2001.

BACKGROUND OF THE INVENTION

1. Field of the Invention

The present invention relates to an instruction input device for an electronic musical instrument and particularly to a instruction input device for an electronic musical instrument capable of inputting two or more instructions to be processed in different manners with a single or common operation panel which has input points arranged in rows and columns or in a matrix.

2. Description of the Related Art

There are various instruction input devices known as a touch panel, a touch screen, and an analog tablet (thus referred to as a touch panel hereinafter). With an electronic musical instrument, such a touch panel is generally utilized as a means for providing settings such as parameters to be used for playing. The touch panel is arranged in which the contact point of a stylus pen or the finger on its input screen is detected from a resistance of a resistor circuit provided beneath the screen and energized with a voltage. Accordingly, operations as signed to the location on the panel are carried out in accordance with the location of the contact point which are detected. Other types of the touch panel than the resistance type including a static capacitance type for detecting the static capacitance at the contact point and a pressure sensitive type for detecting the pressure at the contact point on the screen are known. With an electronic musical instrument, the touch panel is preferably used for selection of the tones and setting of the parameters for various effects. Instructions for selection of the tones and setting of the parameters are arbitrarily inputted by directing the screen of the touch panel in which those instructions are assigned.

Although a group of the instructions are assigned to the screen of the touch panel for ease of implementing their corresponding actions, their arrangement has the following drawbacks to be overcome. An electronic musical instrument can be controlled by instant touch input action for touching at once a target instruction on the screen, such as selection of the tone, and continuous press input action for maintain pressing a target instruction for predetermined period on the screen until a desired value is set, such as setting of the sound level. The two different input actions are hardly implemented on one screen of a conventional touch panel. It is hence proposed that the instant touch input action and the continuous press input action are conducted separately on common screen as switched from one to the other or that the touch panel is accompanied with a separate input device (i.e. a keyboard). However, when two different input means are operated in a combination, operation may become be complicated and it will be unfavorable for a higher level of the play with its parameters modified frequently during the operation.

An input device is disclosed in Japanese Patent Laid-open Publication (Heisei)7-334295 where a pattern of areas are assigned to the touch panel for providing their corresponding instructions and when any of the areas is depressed by the finger a predetermined number of times or for a predetermined length of time without single or instant action, its instructed action can be carried out. However, the input device fails to teach the different input actions performed on a single screen.

SUMMARY OF THE INVENTION

It is hence an object of the present invention to provide an instruction input device arranged capable of inputting instructions on a single screen while identifying two different mode inputs, instant touch input and continuous press input.

As a first feature of this invention, an instruction input device for an electronic musical instrument arranged capable of sensing the physical contact on a screen image to acknowledge the demand of actions for generating sounds, wherein the screen is divided into plural areas and each area is designated for either a continuous press input for continuously accepting the demand while the contact remains held or an instant touch input for receiving the demand once whenever the contact is made.

As a second feature of this invention, the input device further comprising an area attribute storage means for storing a data assigned to each of the different display image and indicating which area in the display image is either a continuous press input area or an instant touch input area.

As a third feature of this invention, the input device further comprising a detecting means for detecting the contact point on the display image, an area identifying means for examining from a data output of the area attribute storage means whether the contact point detected by the detecting means is in the continuous press input area or the instant touch input area, an input mode storage means for storing an attribute of the area identified by the determining action of the area identifying means, and a parameter setting means for determining settings of the parameters for generation of sounds according to the attribute of the area stored and received from the input mode storage means.

As a fourth feature of this invention, the continuous press input area includes a movement instruction detecting region for recognizing the movement of the contact point and further comprising a means for calculating the coordinates of the contact point which is shifted from one location to another.

The above described feature of the present invention allows each instruction to be entered in one of the different modes assigned to each of the areas of the screen. Accordingly, a more number of instructions can be entered in the different modes from a single screen display. For example, the sound level can be controlled by continuously changing its setting value through continuously pressing its assigned area while any switch part is turned on and off by instantly touching its assigned area on the same screen display.

Particularly, the fourth feature of the present invention allows the movement of the contact point to be detected in the movement instruction detecting region of an area assigned for the continuous press input and expressed in the coordinates on the screen. As a result, any target item expressed by the coordinates can be pointed and moved by the finger touching directly on the screen display.

BRIEF DESCRIPTION OF THE DRAWINGS

FIG. 8 is a coordinate table defining the location of each area on the screen;

DETAILED DESCRIPTION OF THE PREFERRED EMBODIMENTS

Figure 2:
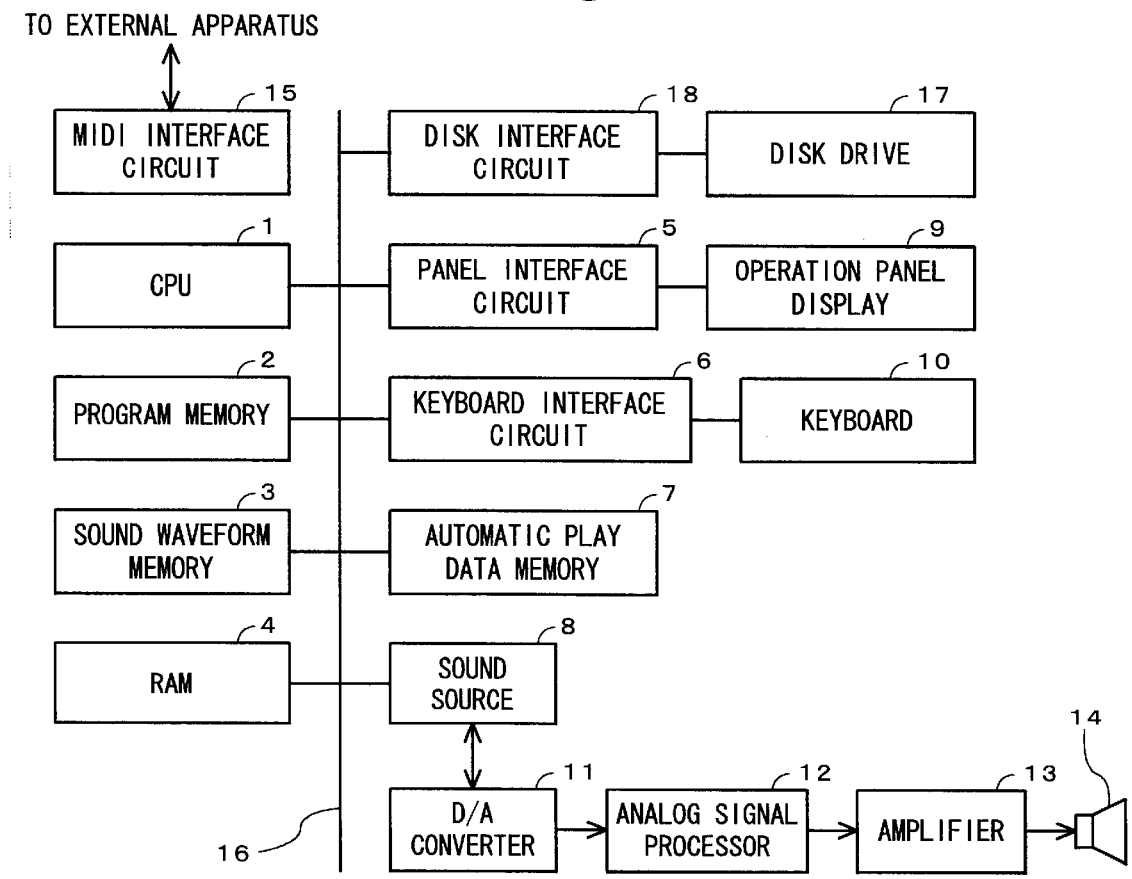
FIG. 2 is a block diagram of an overall arrangement of the electronic musical keyboard of the embodiment.

The present invention will be described in more detail referring to the relevant drawings. FIG. 2 is a block diagram showing a hardware arrangement of an electronic musical keyboard according to one embodiment of the present invention. As shown, a bus line 16 is connected with a CPU 1, a program memory 2, a sound wave form memory 3, a RAM 4, a panel interface circuit 5, a keyboard interface circuit 6, an automatic play data memory 7, and a sound source 8. The panel interface circuit 5 is connected to an operation panel display 9 while the keyboard interface circuit 6 is connected to a keyboard 10. The sound source 8 is further connected to a D/A converter 11, an analog signal processor 12, and an amplifier 13 which is linked to a sound system 14. The CPU 1 is connected via a MIDI interface circuit 15 to an external apparatus such as another musical instrument.

The keyboard 10 has a set of keys accompanied with corresponding sensors which produce detection signals in response to the pressing and releasing actions of the keys. The detection signals are received by the keyboard interface circuit 6 and then transferred as key-on data and key-off data to the CPU 1. Each of the sensors assigned to their respective keys may comprise a pair of sensors for detecting the speed (velocity) of the key pressed. The program memory 2 stores a set of programs which can be executed by the CPU 1, the sound waveform memory 3 stores a variety of sound waveform data, and the automatic play data memory 7 stores a set of automatic play data. The memories 2, 3, and 7 may be implemented by ROMS. The RAM 4 is arranged to provide a work area for temporarily saving data required during the execution of each program by the CPU 1 and a memory area for saving various parameters, such as tempo and loudness, determined by manipulation of the operation panel display 9. In addition, a disk drive 17 may be provided as a data storage for driving floppy disks and connected via a disk interface circuit 18 to the bus line 16.

The operation panel display 9 includes a touch panel, switches, controls, and indicators such as LEDs and may generally be mounted on a control panel provided adjacent to the keyboard 10. The touch panel may be of any appropriate type such as resistance, static capacitance, or piezo-electric type as described previously accordance with the prior art. The sound source 8 includes a plurality of sound generator channels for generating different sounds at the same time and may be operated with a sine wave mixing technique for mixing the sounds.

The CPU 1 is responsive to the program data, key data (pitch, velocity, etc.) received from the keyboard 10, and instruction data of tone, tempo, and rhythm received from the operation panel display 9 to control the action of the sound source 8 as a sound generator for generating a sound signal from waveform data outputs of the sound waveform memory 3. In an automatic play mode, the key data from the keyboard 10 are replaced by automatic play data stored in the automatic play data memory 7. The sound signal released from the sound source 8 is converted into an analog signal by the D/A converter 11 and transferred via the analog signal processor 12 and the amplifier 13 to the sound system 14. The analog signal processor 12 carries out an action for processing the analog signal such as addition of desired effects.

Figure 3:
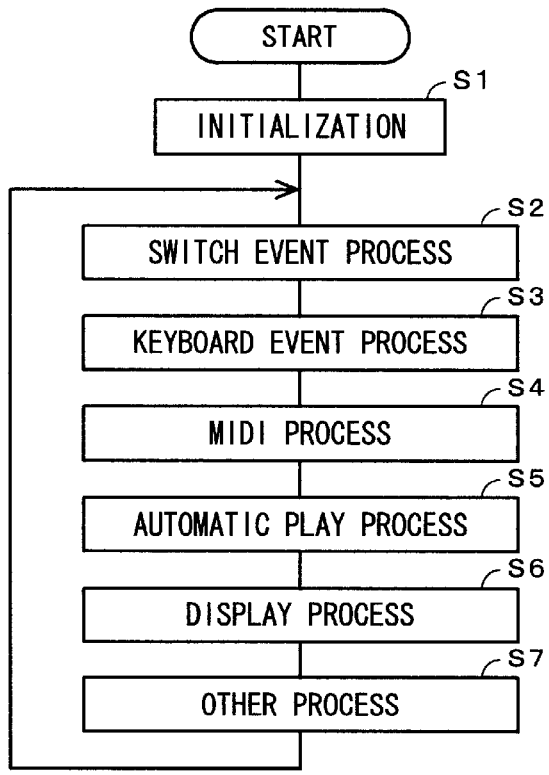
FIG. 3 is a flowchart of a main routine in the electronic musical keyboard of the embodiment.

The main routine of the electronic musical instrument will now be described. As shown in the flowchart of FIG. 3, the main routine starts with initialization of registors and flags at Step S1. The initialization is followed by Step S2 for examining the action of any switch event or whether the touch panel, switches, and controls of the operation panel display 9 are operated (on or off). When any of the switch events is initiated, its corresponding action is carried out. At Step S3, the action of any key (or key event) of the keyboard 10 is examined from the key data and when the key event is initiated, its corresponding action is carried out.

At Step S4, carried out a MIDI process where MIDI data are exchanged for communication with external apparatuses. At Step S5, the automatic play process is conducted. More specifically, when the automatic play mode is selected by a mode select instruction from the operation panel display 9, the automatic play data are read out and used for generating desired sounds.

At Step S6, a display process is carried out where the result of actions is displayed on the touch panel or indicators on the operation panel display 9. At Step S7, other processes are conducted including the process in which continuous operation is needed, such as the continuous switch depressing and switching indicators on and off.

The action of touch panel controls among the switch events will be explained. For example, when the screen of a resistance type touch panel is touched with a finger or a touch pen, its associated resistor circuit generates a pair of voltage outputs x and y which represent distance coordinates along the x and y directions at the touched point on the screen. The voltage outputs x and y are received by the CPU 1 which thus identifies the point at the coordinates (x, y) on the screen of the touch panel from the voltage outputs.

The screen of the touch panel comprises an array of areas defined by the coordinates (x, y). Each onscreen area is designated for either of two input modes, "instant touch input" and "continuous press input". The CPU 1 examines the input mode and its instruction of each switch event and carries out an action corresponding to the instruction.

Figure 4:
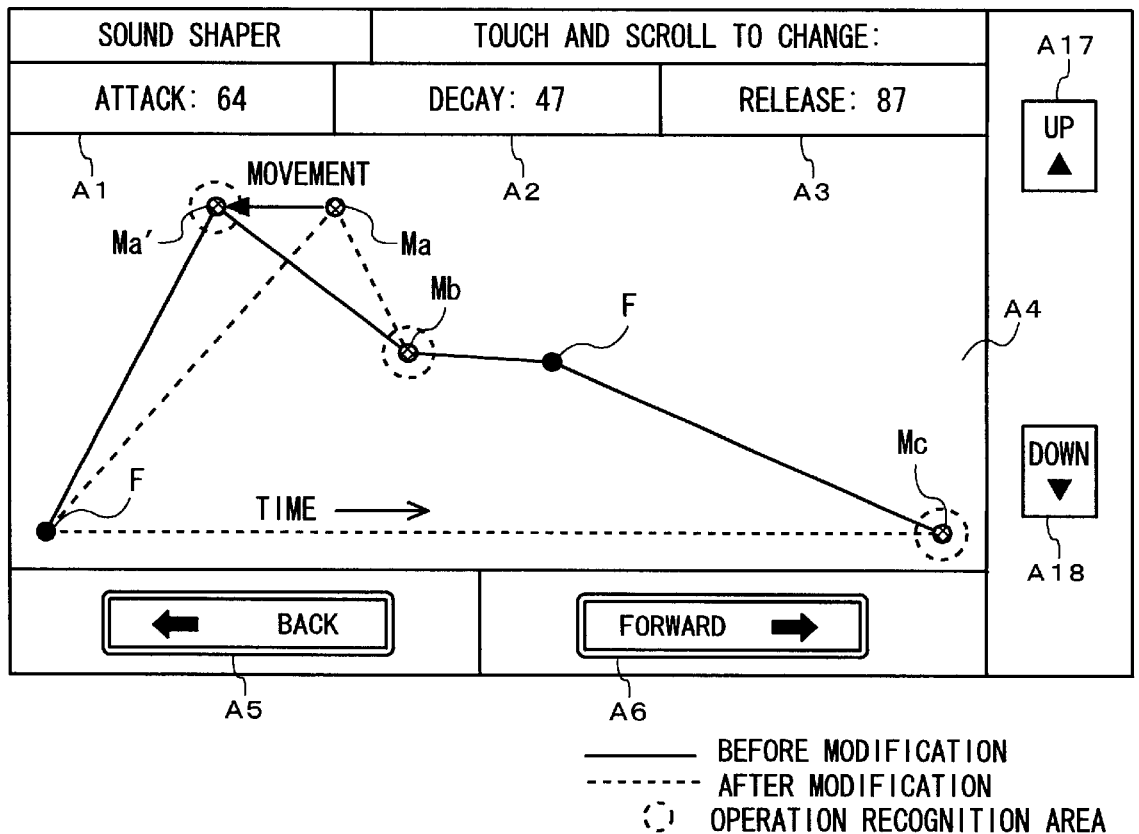
FIG. 4 is a view showing a first example of screen image of the touch panel.

FIG. 4 illustrates a first example image displayed on the screen of the touch panel for setting of the wave form envelope. The example image includes time setting areas A1, A2, and A3 for setting the length of time data for attack, decay, and release in a sequence, a graphic area A4 for displaying the envelope determined by the time settings, and paging areas A5 and A6 for switching the screen image through using "forward" and "back". In the area A4, the movable point M (Ma, Mb, and Mc) and the stationary point F are displayed. The movable point M can be shifted in all direction by the finger directly touching the screen. When the finger touching the point M is moved to a desired location and then departs from the screen, the point M can be shifted from its original location to the desired location. As the envelope in the area A4 is changed in the shape, the values or time settings in the areas A1 to A3 are varied.

The area A4 is designated for the continuous press input and incorporates a movement instruction detecting region where the movement of the contact point can be recognized. When the finger touches down the screen at the point Ma and then moves to the point Ma', the envelope is shifted from the shape FMa denoted by the dotted line to another shape FMa' denoted by the solid line. The shape of the envelope may be changed by operating two, up and down, controllers A17 and A18. For example, the area A1 is switched on for determining the attack time and the controller A17 is pressed for increasing the attack level or speed, thus shifting the envelope from the shape FMa to the shape FMa'. For changing the shape of the envelope, the direct contact with the movable point requires a less number of actions and is much faster in the setting speed than the operation of the controllers.

The areas A1 to A3, A5, and A6 are designated for the instant touch input where the input is implemented by an instant touching action while the area A4 is designated for the continuous press input where the input is implemented by a continuous pressing action.

Figure 5:
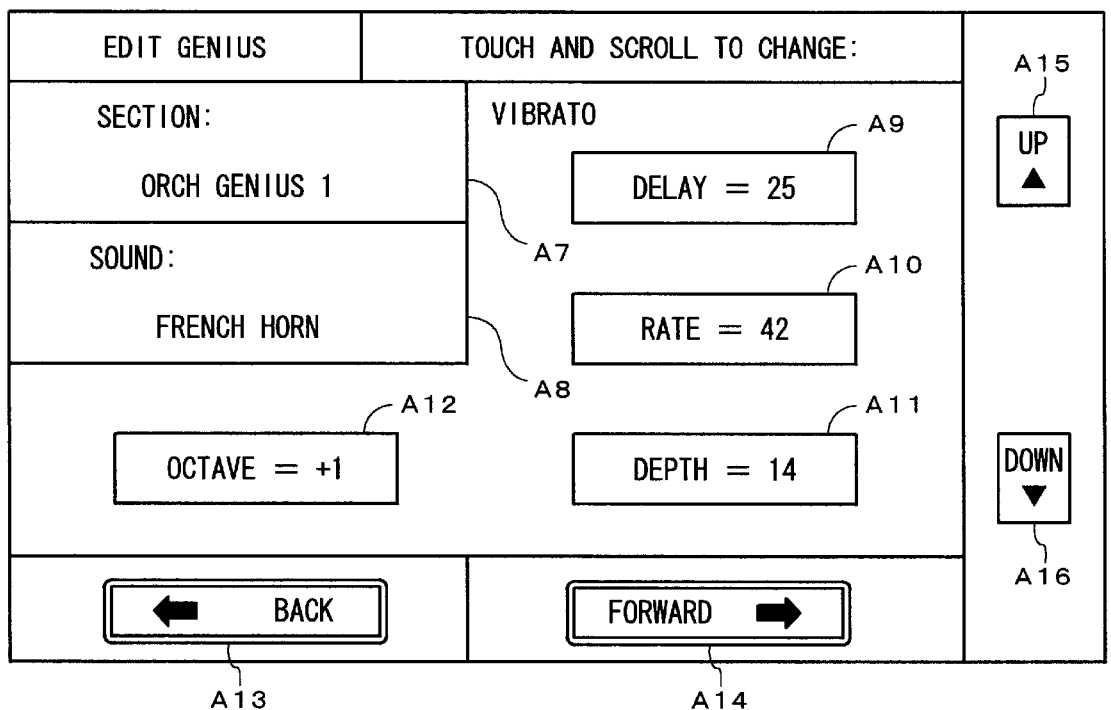
FIG. 5 is a view showing a second example of screen image of the touch panel.

FIG. 5 illustrates a second example image displayed on the screen of the touch panel for setting the tone and the effect. The example image includes tone setting areas A7 and A8, vibrate setting areas A9, A10, and A11 for delay, rate, and depth respectively, an octave setting areas A12, paging areas A13 and A14 for switching the screen image, and controller areas A15 and A16 used for providing direction for changing the parameters.

The areas A7, A8, A9, A10, A11 and A12 are designated for the instant touch input. When any of the areas A7 to A12 is selected and the controller A15 or A16 is pressed, its selected parameter can be changed to a desired value. For example, when the area A8 is selected, the operation of the controller A15 or A16 can modify the sound or timbre. When the area A9 is selected, the operation of the controller A15 or A16 can vary the delay time for vibrate. The controllers A15 and A16 may be designated for either the instant touch input or the continuous press input. When the instant touch input is assigned, one touch action can increase or decrease one step. Even if the controller remains pressed, no further change can be made repeatedly. When the controller is designated for the continuous press input and remains pressed, respective value of parameter can be varied circularly until it is released at a desired value.

Figure 6:
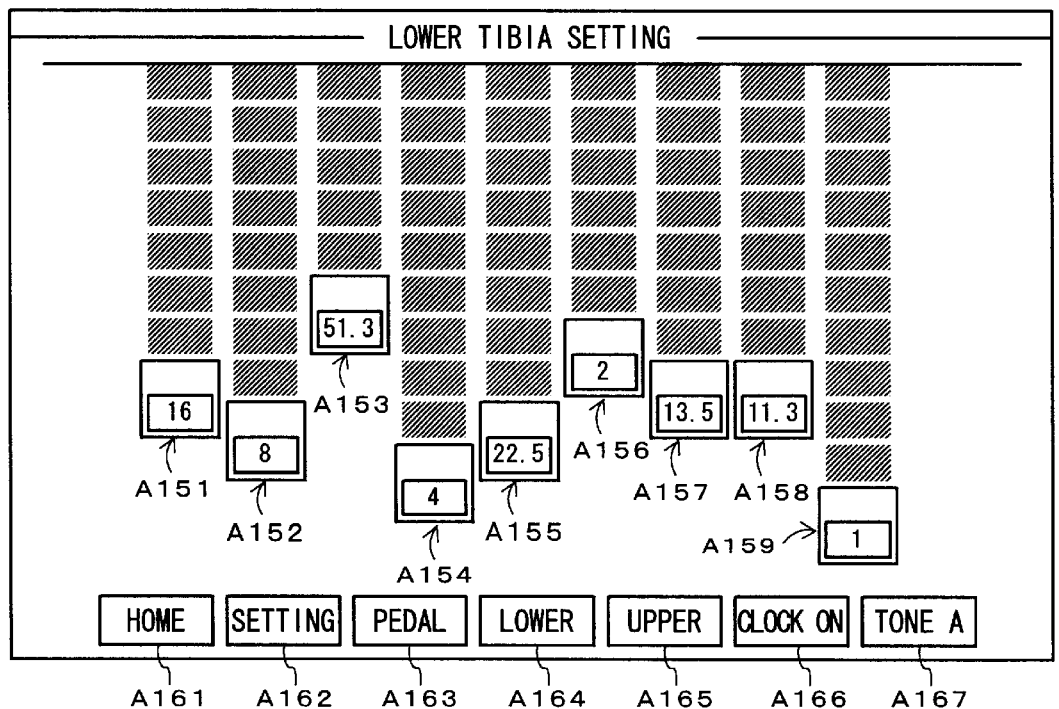
FIG. 6 is a view showing a third example of screen image of the touch panel.

FIG. 6 illustrate a third example image displayed on the screen of the touch panel for determining tone settings over draw-bars. Draw-bar areas A151 to A159 are designated for the continuous press input where the draw-bars can be shifted vertically of the screen for controlling the harmonic level as if mechanical draw-bars are moved up and down by the finger. Lower areas A161 to A167 are designated for the instant touch input and their indicated jobs can be implemented when touched by the finger.

Figure 7:
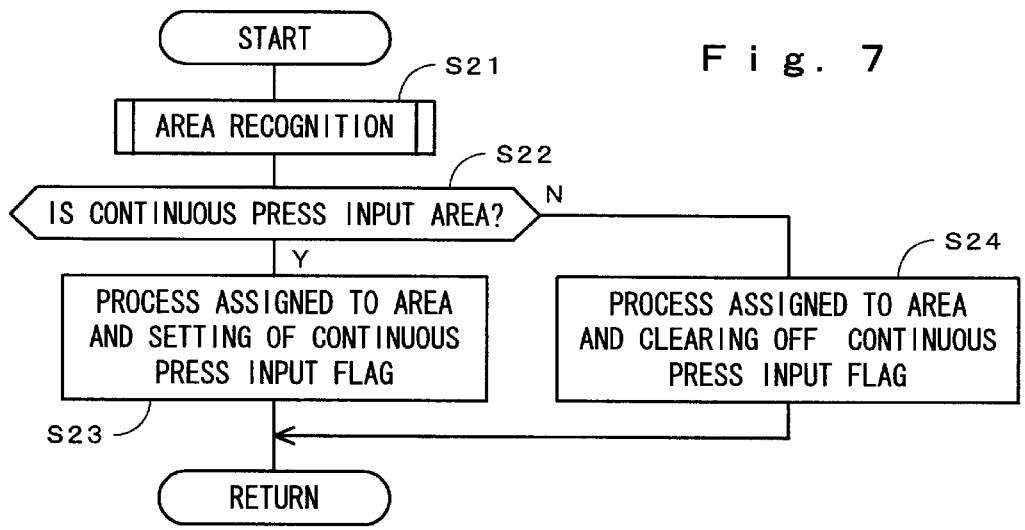
FIG. 7 is a flowchart of a touch panel action routine.

FIG. 7 is a flowchart showing a touch panel process routine for the switch event process. At Step S21, the recognition of an area is carried out for determining which area on the touch panel is touched on. The area recognition will be explained later in more detail referring to FIG. 9. It is then examined at Step S22 whether the recognized area is designated for the continuous press input or not. This can be implemented by examining the flag assigned to each area on the screen. When judgment is affirmative at Step S22, the procedure goes to Step S23 for executing the job of the area and setting the flag of the continuous press input. If judgment is negative at Step S22, the procedure moves to Step S24 for executing the job of the area and clearing the flag of the continuous press input.

The area recognition will now be explained. As described with FIG. 4, the number of areas is different between the screen images. Each screen image carries a predetermined number of areas. Each area having a rectangular shape is defined by the coordinates (x, y) of the diagonal location in the screen and stored in the form shown in FIG. 8. FIG. 8 is a table showing a list of the areas of m screen images. The table including the number of areas in each screen image and the coordinates (x, y) of each area can be stored in the program memory 2.

Figure 9:
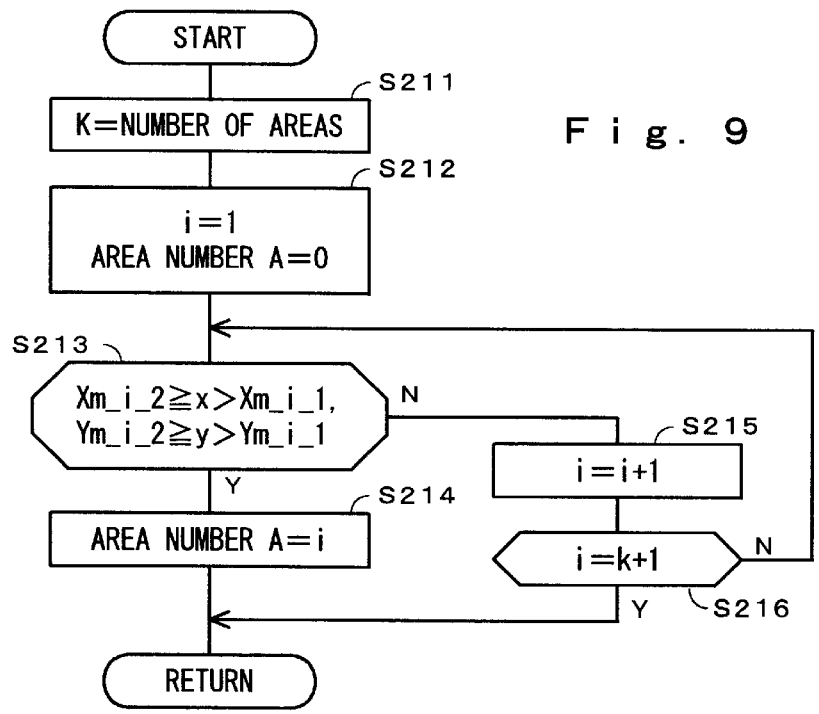
FIG. 9 is a flowchart for recognizing the areas.

FIG. 9 is a flowchart showing a procedure of the area recognition where the areas in the mth screen image defined in FIG. 8 are recognized. At Step S211, the number of areas in the mth screen image is read out and set to k. At Step S212, the variable i representing the process number is set to 1 and the area number A is set to "0". It is then examined at Step S213 whether or not the directed coordinates (x, y) are within the first area having a range from Xm,i,2 to Xm,i,1 and a range from Ym,i,2 to Ym,i,1 respectively. When it is affirmative at Step S213, the procedure advances to Step S214 where the area number A is set to "i". Then, the area is identified by "i".

When it is judged negative at Step S213, the procedure goes to Step S215 where the variable "i" is incremented by one (+1). It is then examined at Step S216 whether the variable i is (k+1) or not, i.e. whether all the areas in the mth screen image are recognized or not. If it is judged negative at Step S215, the procedure returns back to Step S213. When it is judged affirmative, the procedure is terminated.

Figure 10:
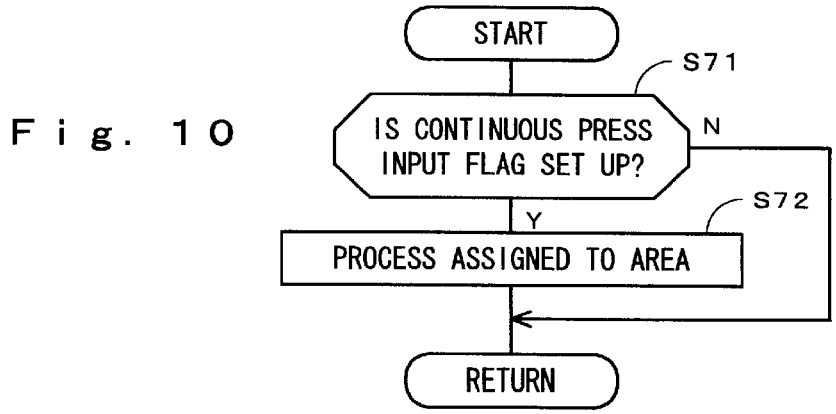
FIG. 10 is a flowchart for the area assigned for the continuous press input.

FIG. 10 is a flowchart showing a procedure of initiating the action of the area designated for the continuous press input. This procedure is assigned to Step S7 shown in FIG. 3. It is examined at Step S71 whether the flag of the continuous press input is set or not. This is determined from the result of the procedure shown in FIG. 9. When it is affirmative, the procedure goes to Step S72 for carrying out the job of the area selected or pointed by the finger. For example, the arrangement of the draw-bars or the shape of the envelope is continuously modified in response to a change in the directed position within the area.

Figure 11:
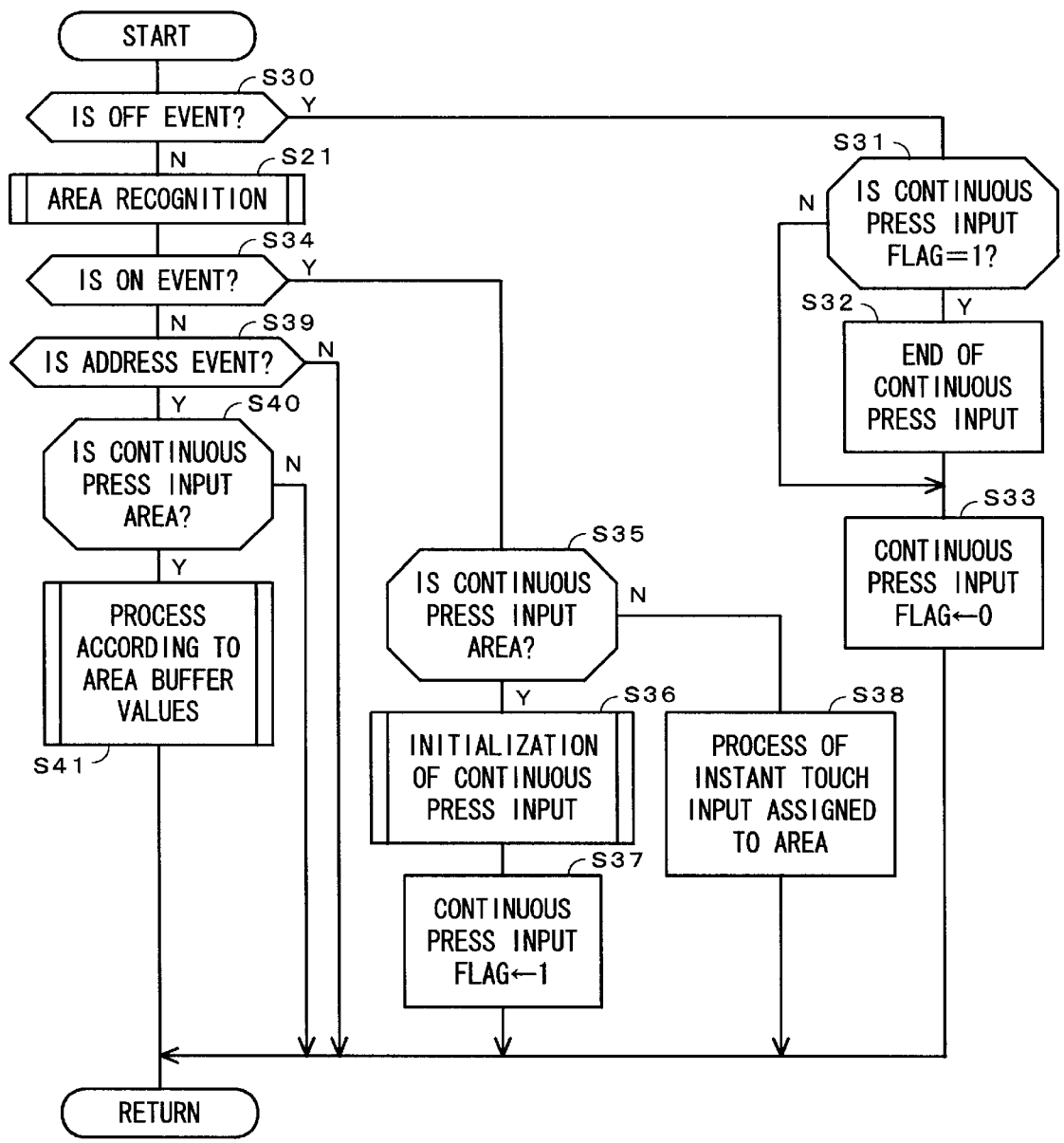
FIG. 11 is a flowchart of a procedure for operating the touch panel.

FIG. 11 is a flowchart showing a procedure of operating the touch panel including the area recognition which is related to setting envelope shown in FIG. 4. The procedure starts with examining at Step S30 whether or not the touch panel action is shifted from the contact state to the non-contact stage (off event). When it is affirmative, the procedure goes to Step S31 where it is examined whether the flag of the continuous press input is set up (=1) or not. When it is affirmative, the action for the continuous press input is terminated at S32 and the procedure advances to Step S33. If the flag is not set up, the procedures jumps from Step S31 to Step S33. At Step S33, the flag for the continuous press input is lowered (=0).

When the action is not at the off event state, the procedure goes from Step S30 to Step S21 for the area recognition. It is then examined at Step S34 whether the on event or touch panel contact action is executed or not. When on event is executed, the procedure advances to Step S35 where it is examined whether the continuous press input area is touched or not. When it is affirmative, the procedure moves to Step S36 for initializing the continuous press input setting. This action will be explained in more detail referring to FIG. 12. Then, at Step S37 the flag for the continuous press input is set up (=1). If it is judged that the action is not at the continuous press input area, the procedure goes to Step S38 for carrying out the action assigned for the instant touch input area.

When it is judged at Step S34 that the on event action is not executed, the procedure moves to Step S39 where it is examined whether the action is an address event (a movement of the contact point) or not. If it is address event, the procedure moves Step S40 where it is examined whether or not the event action is at the continuous press input area. When it is affirmative, the procedure advances to Step S41 for carrying out the job of the area based on the area buffer value. The process of Step S41 will be explained in more detail referring to FIG. 13.

Figure 12:
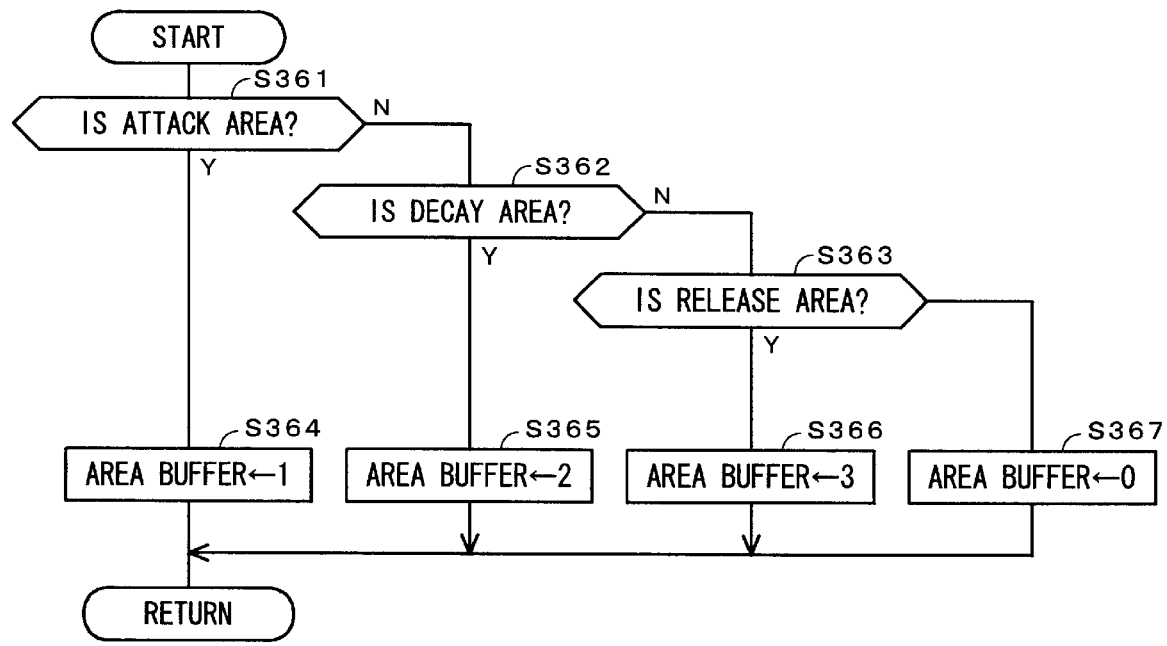
FIG. 12 is a flowchart showing a part (1) of the touch panel action procedure.

The action at Step S36 is now explained. As shown in the flowchart of FIG. 12, there are examined at Steps S361, S362, and S363 whether selected is the attack area or not, whether the decay area or not, and whether the release area or not respectively. The attack, decay, and release can be modified as are determined by their respective movable points Ma, Mb, and Mc in the graphic area shown in FIG. 4. When it is judged that the attack area, the decay area, and the release area are selected, the area buffer value is turned to "1" at Step S364, to "2" at Step S365, and to "33" at Step S366 respectively. If it is judged that the on event is selected at non of the attack area, the decay area, and the release area, the procedure goes to Step S367 for setting the area buffer value to "0".

Figure 13:
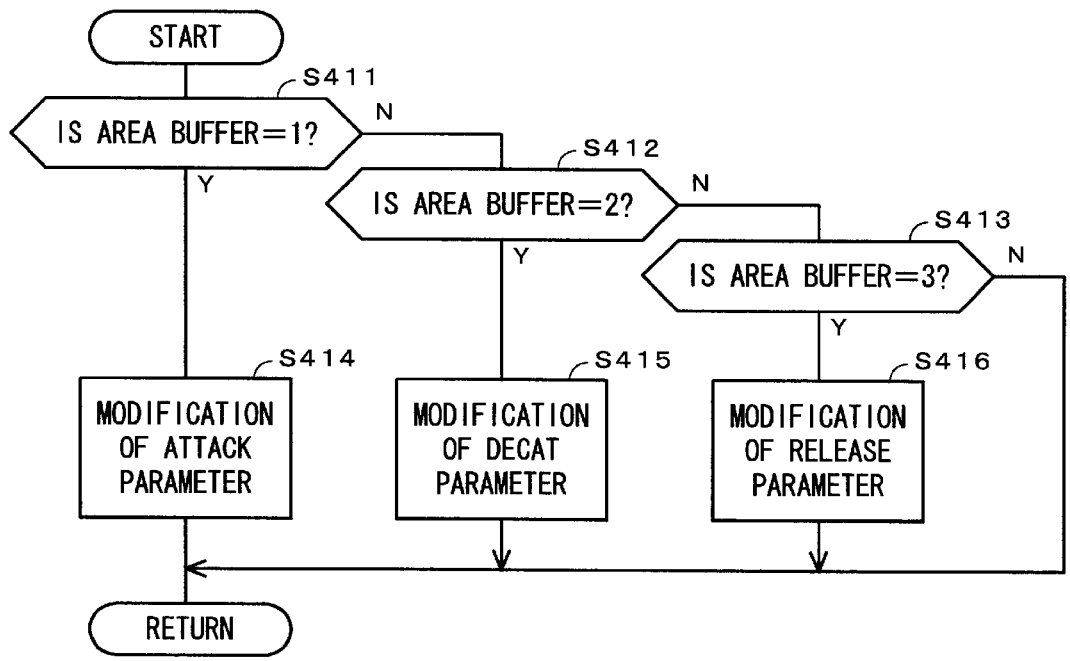
FIG. 13 is a flowchart showing a part (2) of the touch panel action procedure.

The action at Step S41 is now explained. As shown in the flowchart of FIG. 13, there are examined at Steps S411, S412, and S413 whether the buffer value is "1" or not, whether "2" or not, and whether "3" or not respectively. As the buffer value is known, the movable point can be identified from Ma, Mb, and Mc. When the buffer value is "1", the attack parameter can be determined at Step S414. When the buffer value is "2", the decay parameter can be determined at Step S415. When the buffer value is "3", the attack parameter can be determined at Step S416. When the buffer value is "0", non of the movable points is selected and the action of modifying the parameter is not carried out.

Figure 1:
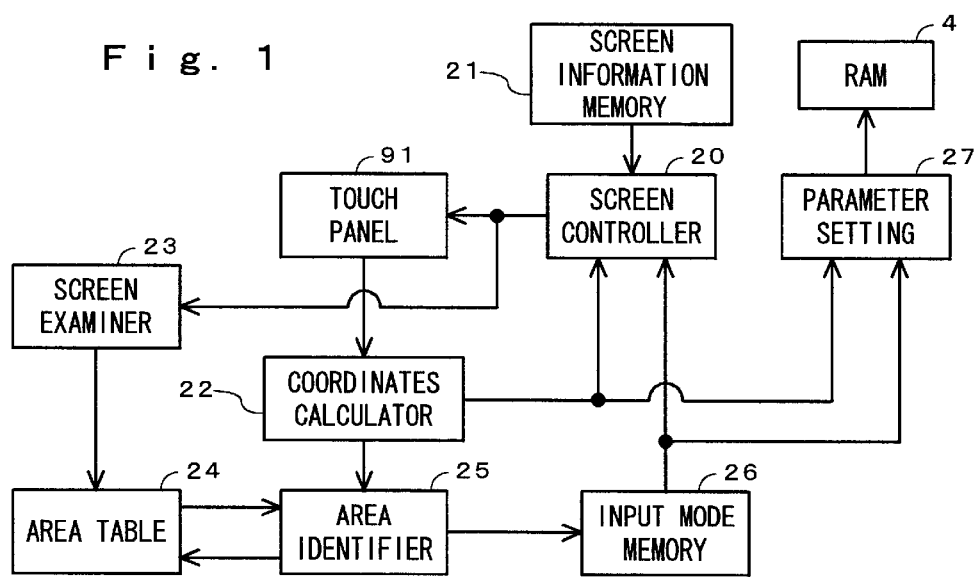
FIG. 1 is a block diagram showing primary functions of an electronic musical keyboard according to one embodiment of the present invention.

FIG. 1 is a block diagram showing the primary functions of a touch panel according to the present invention. The process of the touch panel 91 provided as an instruction input device in the operation panel display 9 is controlled by a screen controller 20. A screen information memory 21 is provided for storing programs and data for displaying a plural number of images. The screen controller 20 supplies the resistor circuit in the touch panel with a voltage and performs an action of controlling the screen image with the programs and data received from the memory 21. The touch panel 91 detects a change in the voltage at the contact point on its screen and produces a detection signal when it is touched by the finger or a stylus pen. A coordinates calculator 22 is responsive to the detection signal from the touch panel 91 for calculating the coordinates (x, y) at the contact point.

A screen examiner 23 examines a screen image, which is being displayed, from the control data of the screen controller 20 for the touch panel 91 and provides an area table 24 with a data of identifying the image. The area table 24 which acts as an area attribute storage means holds the continuous press input data of the areas in each image or typically the flags indicating the attribute of the areas. An area identifier 25 retrieves one of the tables stored in the area table 24 which corresponds to the image determined by the screen examiner 23 and examines whether the point defined by the coordinates (x, y) is in the continuous press input area or the instant touch input area. A result of the examination is then saved as the area attribute data in an input mode memory 26. More specifically, when the area is designated for the continuous press input, the flag of the continuous press input is set up.

Upon receiving the flag and the output of the coordinates calculator 22, the screen controller 20 switches the screen image and updates the settings and graphic item on the screen. Also, a parameter setting 27 when receiving the flag and the output of the coordinates calculator modifies the parameters for the envelope and the effects which are then received by the RAM 4.

As set forth above, the embodiment of the present invention allows a single touch panel to be controlled with two different input manners, the continuous press input by pressing continuously and the instant touch input by touching once, thus directing different types of instructions.

As apparent from the foregoing description, the present invention defined in claims 1 to 6 allows two different input manners, the continuous press input by pressing continuously and the instant touch input by touching once, to be implemented on a single screen. Accordingly, a more number of instructions can be inputted from one screen display on the touch panel screen, hence minimizing the troublesome switching between display images. For example, the selection of an effect and the modification of its parameters can easily be conducted during the playing, hence permitting a higher level of the playing action.

Particularly, the feature of the present invention defined in claims 4 to 6 allows the movement of the contact point to be detected in the movement instruction detecting region in the continuous press input area and expressed in the coordinates. Accordingly, any item expressed by the coordinates can be moved by the finger pointed directly and shifted.

What is claimed is:

1. An electronic musical instrument comprising:
   a touch input device capable of receiving an instruction through touching for setting parameters used to generate a musical sound, said touch input device comprising:
      a touch panel having a first input region for producing a first signal used to set a first parameter based on a duration of a touch applied on said first input region, and a second input region for producing a second signal used to set a second parameter each time the touch is applied on said second input region regardless of the duration of the touch.

2. The electronic musical instrument of claim 1, wherein the touch panel is capable of displaying a plurality of screen images, said touch panel comprising region attribute storage means for storing attributes corresponding to each of the screen images, wherein at least one of said attributes indicates whether a region on the touch panel corresponding to the screen image is the first input region or the second input region.

3. The electronic musical instrument of claim 2, further comprising:

coordinate detecting means for detecting coordinates of a touch position on the touch panel;

means for identifying whether the touch position is in the first input region or in the second input region by comparing the coordinates of the touch position with the coordinates corresponding to the first and second input regions;

means for determining the attributes of the region that has been touched to provide the instruction; and means for setting the parameters in accordance with the determined attributes of said region.

4. The electronic musical instrument of claim 3, wherein said coordinate detecting means is capable of outputting the coordinates continuously as the touch position is moved in the first input region.

5. The electronic musical instrument of claim 1, wherein the parameters are used to provide variation to a tone, volume and timbre of the musical sound.

6. An electronic musical instrument comprising:

a touch input device capable of receiving an instruction through touching for setting parameters used to generate a musical sound, said touch input device comprising:

a touch panel having a first input region for producing a first signal used to set a first parameter based on a distance between a position of a touch applied on said first input region and the position of a previous touch applied on said first input region, and a second input region for producing a second signal used to set a second parameter each time the touch is applied on said second input region regardless of the duration of the touch.

7. The electronic musical instrument of claim 6, wherein the touch panel is capable of displaying a plurality of screen images, said touch panel comprising region attribute storage means for storing attributes corresponding to each of the screen images, wherein at least one of said attributes indicates whether a region on the touch panel corresponding to the screen image is the first input region or the second input region.

8. The electronic musical instrument of claim 7, further comprising:

coordinate detecting means for detecting coordinates of a touch position on the touch panel;

means for identifying whether the touch position is in the first input region or in the second input region by comparing the coordinates of the touch position with the coordinates corresponding to the first and second input regions;

means for determining the attributes of the region that has been touched to provide the instruction; and means for setting the parameters in accordance with the determined attributes of said region.

9. The electronic musical instrument of claim 8, wherein said coordinate detecting means is capable of outputting the coordinates continuously as the touch position is moved in the first input region.

10. The electronic musical instrument of claim 6, wherein the parameters are used to provide variation to a tone, volume and timbre of the musical sound.

11. A method of providing at least two instructions to an electronic musical instrument through touching a touch panel having a first input region and a second input region, said two instructions to be processed in different manners to set parameters used to generate a musical sound, said method comprising:

applying a touch on the touch panel;

producing a first signal used to set a first parameter based on a duration of the touch applied on the first input region of the touch panel; and producing a second signal used to set a second parameter each time the touch is applied on the second input region of the touch panel regardless of the duration of the touch.

12. The method of claim 11, wherein the touch panel is capable of displaying a plurality of screen images, said touch panel comprising region attribute storage means for storing attributes corresponding to each of the screen images, wherein at least one of said attributes indicates whether a region on the touch panel corresponding to the screen image is the first input region or the second input region.

13. The method of claim 12, further comprising detecting coordinates of a touch position on the touch panel.

14. The method of claim 13, wherein each of producing the first signal and producing the second signal comprises:

identifying whether the touch position is in the first input region or in the second input region by comparing the coordinates of the touch position with the coordinates corresponding to the first and second input regions;

determining the attributes of the region that has been touched to provide the instruction; and setting at least one of the parameters in accordance with the determined attributes of said region.

15. The method of claim 14, further comprising outputting the coordinates as the touch position is moved in the first input region.

16. A method of providing at least two instructions to an electronic musical instrument through touching a touch panel having a first input region and a second input region, said two instructions to be processed in different manners to set parameters used to generate a musical sound, said method comprising:

applying a touch on the touch panel;

producing a first signal used to set a first parameter based on a distance between a position of a touch applied on said first input region and the position of a previous touch applied on said first input region; and producing a second signal used to set a second parameter each time the touch is applied on the second input region of the touch panel regardless of the duration of the touch.

17. The method of claim 16, wherein the touch panel is capable of displaying a plurality of screen images, said touch panel comprising region attribute storage means for storing attributes corresponding to each of the screen images, wherein at least one of said attributes indicates whether a region on the touch panel corresponding to the screen image is the first input region or the second input region.

18. The method of claim 17, further comprising detecting coordinates of a touch position on the touch panel.

19. The method of claim 18, wherein each of producing the first signal and producing the second signal comprises:

identifying whether the touch position is in the first input region or in the second input region by comparing the coordinates of the touch position with the coordinates corresponding to the first and second input regions;

determining the attributes of the region that has been touched to provide the instruction; and setting at least one of the parameters in accordance with the determined attributes of said region.

20. The method of claim 19, further comprising outputting the coordinates as the touch position is moved in the first input region.

* * * * *